(12) United States Patent
Sheets et al.

(10) Patent No.: US 7,503,048 B1
(45) Date of Patent: Mar. 10, 2009

(54) SCHEDULING SYNCHRONIZATION OF PROGRAMS RUNNING AS STREAMS ON MULTIPLE PROCESSORS

(75) Inventors: Kitrick Sheets, Morrisville, NC (US); Josh Williams, Minneapolis, MN (US); Jonathan Gettler, Lakeville, MN (US); Steve Piatz, Eagan, MN (US); Andrew B. Hastings, Eagan, MN (US); Peter Hill, Bloomington, MN (US); James G. Bravatto, Inver Grove Heights, MN (US); James R. Kohn, Inver Grove Heights, MN (US); Greg Titus, Santa Fe, NM (US)

(73) Assignee: Cray Incorporated, Seattle, WA (US)

( * ) Notice: Subject to any disclaimer, the term of this patent is extended or adjusted under 35 U.S.C. 154(b) by 850 days.

(21) Appl. No.: 10/643,769

(22) Filed: Aug. 18, 2003

(51) Int. Cl.
*G06F 9/46* (2006.01)
*G06F 15/00* (2006.01)
*G06F 7/38* (2006.01)

(52) U.S. Cl. .............................. 718/108; 712/1; 712/43; 712/220; 719/310

(58) Field of Classification Search ......... 718/100–108; 712/1, 43, 220; 719/310
See application file for complete search history.

(56) References Cited

U.S. PATENT DOCUMENTS

| | | | |
|---|---|---|---|
| 3,881,701 A | 5/1975 | Schoenman et al. | |
| RE28,577 E | 10/1975 | Schmidt | |
| 4,380,786 A | 4/1983 | Kelly | |
| 4,414,624 A * | 11/1983 | Summer et al. ............... | 712/21 |
| 4,541,046 A | 9/1985 | Nagashima et al. | |
| 4,733,348 A | 3/1988 | Hiraoka et al. | |
| 4,771,391 A | 9/1988 | Blasbalg | |
| 4,868,818 A | 9/1989 | Madan et al. | |
| 4,888,679 A | 12/1989 | Fossum et al. | |
| 4,933,933 A | 6/1990 | Dally et al. | |
| 5,008,882 A | 4/1991 | Peterson et al. | |

(Continued)

FOREIGN PATENT DOCUMENTS

EP 0353819 A2 2/1990

(Continued)

OTHER PUBLICATIONS

"Cray Assembly Language (CAL) for Cray X1™ Systems Reference Manual", *Section 2.6, Memory Ordering*, http://docs.cray.com/books/S-2314-51/index.html, (Jun. 2003), 302 pgs.

(Continued)

*Primary Examiner*—Meng-Al T. An
*Assistant Examiner*—Jennifer N. To
(74) *Attorney, Agent, or Firm*—Schwegman, Lundberg & Woessner, P.A.

(57) ABSTRACT

Systems and methods for scheduling program units that are part of a process executed within an operating system are disclosed. Additionally, at least one thread is started within the operating system, the thread is associated with the process. Further, a plurality of streams within the thread are selected for execution on a multiple processor unit. Upon the occurrence of a context shifting event, one of the streams enters a kernel mode. If the first stream to enter kernel mode must block, then the execution of the other streams of the plurality of streams is also blocked.

21 Claims, 3 Drawing Sheets

U.S. PATENT DOCUMENTS

| | | |
|---|---|---|
| 5,012,409 A | 4/1991 | Fletcher et al. |
| 5,031,211 A | 7/1991 | Nagai et al. |
| 5,036,459 A | 7/1991 | Den Haan et al. |
| 5,068,851 A | 11/1991 | Bruckert et al. |
| 5,072,883 A | 12/1991 | Vidusek |
| 5,105,424 A | 4/1992 | Flaig et al. |
| 5,157,692 A | 10/1992 | Horie et al. |
| 5,161,156 A | 11/1992 | Baum et al. |
| 5,170,482 A | 12/1992 | Shu et al. |
| 5,175,733 A | 12/1992 | Nugent |
| 5,197,130 A | 3/1993 | Chen et al. |
| 5,218,601 A | 6/1993 | Chujo et al. |
| 5,218,676 A | 6/1993 | Ben-ayed et al. |
| 5,220,804 A | 6/1993 | Tilton et al. |
| 5,239,545 A | 8/1993 | Buchholz |
| 5,276,899 A | 1/1994 | Neches |
| 5,280,474 A | 1/1994 | Nickolls et al. |
| 5,297,738 A | 3/1994 | Lehr et al. |
| 5,311,931 A | 5/1994 | Lee |
| 5,313,628 A | 5/1994 | Mendelsohn et al. |
| 5,313,645 A | 5/1994 | Rolfe |
| 5,331,631 A | 7/1994 | Teraslinna |
| 5,333,279 A | 7/1994 | Dunning |
| 5,341,482 A | 8/1994 | Cutler et al. |
| 5,341,504 A | 8/1994 | Mori et al. |
| 5,347,450 A | 9/1994 | Nugent |
| 5,353,283 A | 10/1994 | Tsuchiya |
| 5,365,228 A | 11/1994 | Childs et al. |
| 5,375,223 A | 12/1994 | Meyers et al. |
| 5,418,916 A | 5/1995 | Hall et al. |
| 5,430,850 A | 7/1995 | Papadopoulos et al. |
| 5,430,884 A | 7/1995 | Beard et al. |
| 5,434,995 A | 7/1995 | Oberlin et al. |
| 5,435,884 A | 7/1995 | Simmons et al. |
| 5,437,017 A | 7/1995 | Moore et al. |
| 5,440,547 A | 8/1995 | Easki et al. |
| 5,446,915 A | 8/1995 | Pierce |
| 5,456,596 A | 10/1995 | Gourdine |
| 5,472,143 A | 12/1995 | Bartels et al. |
| 5,497,480 A | 3/1996 | Hayes et al. |
| 5,517,497 A | 5/1996 | LeBoudec et al. |
| 5,530,933 A | 6/1996 | Frink et al. |
| 5,546,549 A | 8/1996 | Barrett et al. |
| 5,548,639 A | 8/1996 | Ogura et al. |
| 5,550,589 A | 8/1996 | Shiojiri et al. |
| 5,555,542 A | 9/1996 | Ogura et al. |
| 5,560,029 A | 9/1996 | Papadopoulos et al. |
| 5,606,696 A * | 2/1997 | Ackerman et al. ......... 718/108 |
| 5,613,114 A | 3/1997 | Anderson et al. |
| 5,640,524 A | 6/1997 | Beard et al. |
| 5,649,141 A | 7/1997 | Yamazaki |
| 5,721,921 A | 2/1998 | Kessler et al. |
| 5,740,967 A | 4/1998 | Simmons et al. |
| 5,765,009 A | 6/1998 | Ishizaka |
| 5,781,775 A | 7/1998 | Ueno |
| 5,787,494 A | 7/1998 | Delano et al. |
| 5,796,980 A | 8/1998 | Bowles |
| 5,812,844 A | 9/1998 | Jones et al. |
| 5,835,951 A | 11/1998 | McMahan |
| 5,860,146 A | 1/1999 | Vishin et al. |
| 5,860,602 A | 1/1999 | Tilton et al. |
| 5,897,664 A | 4/1999 | Nesheim et al. |
| 5,946,717 A | 8/1999 | Uchibori |
| 5,951,882 A | 9/1999 | Simmons et al. |
| 5,978,830 A | 11/1999 | Nakaya et al. |
| 5,987,571 A | 11/1999 | Shibata et al. |
| 5,995,752 A | 11/1999 | Chao et al. |
| 6,003,123 A | 12/1999 | Carter et al. |
| 6,014,728 A | 1/2000 | Baror |
| 6,016,969 A | 1/2000 | Tilton et al. |
| 6,047,323 A | 4/2000 | Krause |
| 6,088,701 A | 7/2000 | Whaley et al. |
| 6,101,590 A | 8/2000 | Hansen |
| 6,105,113 A | 8/2000 | Schimmel |
| 6,161,208 A | 12/2000 | Dutton et al. |
| 6,247,169 B1 | 6/2001 | DeLong |
| 6,269,390 B1 | 7/2001 | Boland |
| 6,269,391 B1 | 7/2001 | Gillespie |
| 6,308,250 B1 | 10/2001 | Klausler |
| 6,308,316 B1 | 10/2001 | Hashimoto et al. |
| 6,339,813 B1 | 1/2002 | Smith et al. |
| 6,356,983 B1 | 3/2002 | Parks |
| 6,366,461 B1 | 4/2002 | Pautsch et al. |
| 6,389,449 B1 * | 5/2002 | Nemirovsky et al. ........ 718/108 |
| 6,490,671 B1 | 12/2002 | Frank et al. |
| 6,496,902 B1 | 12/2002 | Faanes et al. |
| 6,519,685 B1 | 2/2003 | Chang |
| 6,553,486 B1 | 4/2003 | Ansari |
| 6,591,345 B1 | 7/2003 | Seznec |
| 6,615,322 B2 | 9/2003 | Arimilli et al. |
| 6,684,305 B1 | 1/2004 | Deneau |
| 6,782,468 B1 | 8/2004 | Nakazato |
| 6,816,960 B2 | 11/2004 | Koyanagi |
| 6,910,213 B1 | 6/2005 | Hirono et al. |
| 6,922,766 B2 | 7/2005 | Scott |
| 6,925,547 B2 | 8/2005 | Scott et al. |
| 6,931,510 B1 | 8/2005 | Damron |
| 6,952,827 B1 | 10/2005 | Alverson et al. |
| 6,976,155 B2 | 12/2005 | Drysdale et al. |
| 7,028,143 B2 | 4/2006 | Barlow et al. |
| 7,089,557 B2 | 8/2006 | Lee |
| 7,103,631 B1 | 9/2006 | van der Veen |
| 7,111,296 B2 | 9/2006 | Wolrich et al. |
| 7,137,117 B2 | 11/2006 | Ginsberg |
| 7,143,412 B2 | 11/2006 | Koenen |
| 7,162,713 B2 | 1/2007 | Pennello |
| 7,191,444 B2 | 3/2007 | Alverson et al. |
| 7,334,110 B1 | 2/2008 | Faanes et al. |
| 2002/0078122 A1 | 6/2002 | Joy et al. |
| 2002/0091747 A1 | 7/2002 | Rehg et al. |
| 2002/0169938 A1 | 11/2002 | Scott et al. |
| 2002/0172199 A1 | 11/2002 | Scott et al. |
| 2003/0005380 A1 | 1/2003 | Nguyen et al. |
| 2003/0097531 A1 | 5/2003 | Arimilli et al. |
| 2004/0044872 A1 | 3/2004 | Scott |
| 2004/0064816 A1 | 4/2004 | Alverson et al. |
| 2004/0162949 A1 | 8/2004 | Scott et al. |
| 2005/0044128 A1 | 2/2005 | Scott et al. |
| 2005/0044339 A1 | 2/2005 | Sheets |
| 2005/0044340 A1 | 2/2005 | Sheets et al. |
| 2005/0125801 A1 | 6/2005 | King |

FOREIGN PATENT DOCUMENTS

| | | |
|---|---|---|
| EP | 0473452 A2 | 3/1992 |
| EP | 0475282 A2 | 3/1992 |
| EP | 0501524 A2 | 9/1992 |
| EP | 0570729 A2 | 11/1993 |
| WO | WO-87/01750 A1 | 3/1987 |
| WO | WO-88/08652 A1 | 11/1988 |
| WO | WO-95/16236 A1 | 6/1995 |
| WO | WO-96/102831 A1 | 4/1996 |
| WO | WO-96/32681 A1 | 10/1996 |

OTHER PUBLICATIONS

"Deadlock-Free Routing Schemes on Multistage Interconnection Networks", *IBM Technical Disclosure Bulletin*, 35, (Dec. 1992), 232-233.

"ECPE 4504: Computer Organization Lecture 12: Computer Arithmetic", The Bradley Department of Electrical Engineering, (Oct. 17, 2000), 12 pgs.

"Msync—Synchronise Memory With Physical Storage", *The Single UNIX® Specification, Version 2: Msync, The Open Group*, http://www.opengroup.org/onlinepubs/007908799/xsh/msync.html, (1997), 3 pgs.

Abts, D., "So Many States, So Little Time: Verifying Memory Coherence in the Cray X1", *Parallel and Distributed Processing Symposium*, (Apr. 22, 2003), 11-20.

Adve, V. S., et al., "Performance Analysis of Mesh Interconnection Networks with Deterministic Routing", *Transactions on Parallel and Distributed Systems*, 5(5), (Mar. 1994), 225-246.

Bolding, K., "Non-Uniformities Introduced by Virtual Channel Deadlock Prevention", *Technical Report 92-07-07, Department of Computer Science and Engineering, FR-35 University of Washington*; Seattle, WA 98195, (Jul. 21, 1992), 1-6.

Bolla, R., "A Neural Strategy for Optimal Multiplexing of Circuit and Packet-Switched Traffic", *Proceedings, IEEE Global Telecommunications Conference*, (1992), 1324-1330.

Boura, Y. M., et al., "Efficient Fully Adaptive Wormhole Routing in n-dimensional Meshes", *Proceedings, International Conference on Distributed Computing Systems*, (Jun. 1994), 589-596.

Bundy, A., et al., "Turning Eureka Steps into Calculations in Automatic Program Synthesis", *Proceedings of UK IT 90, (IEE Conf. Pub. 316) (DAI Research Paper 448)*, (1991), 221-226.

Carlile, B. R., "Algorithms and Design: The CRAY APP Shared-Memory System", *COMPCON Spring '93. Digest of Papers.*, (Feb. 22, 1993), 312-320.

Chen, Y., et al., "UTLB: A Mechanism for Address Translation on Network Interfaces", *Proceedings of the Eighth International Conference on Architectural Support for Programming Languages and Operating Systems (ASPLOS)*, (1998), 193-204.

Chien, A. A., et al., "Planar-Adaptive Routing: Low-Cost Adaptive Networks for Multiprocessors", *Proceedings 19th International. Symposium on Computer Architecture*, (May 1992), 268-277.

Cohoon, J., et al., *C++ Program Design*, McGraw-Hill Companies Inc., 2nd *Edition*, (1999), p. 493.

Dally, W. J., et al., "Deadlock-Free Adaptive Routing in Multicomputer Networks Using Virtual Channels", *IEEE Transactions on Parallel and Distributed Systems*, 4(4), (Apr. 1993), 466-475.

Dally, W., et al., "Deadlock-Free Message Routing in Multiprocessor Interconnection Networks", *IEEE Transactions on Computers*, C-36, (May 1987), 547-553.

Dally, W., "Performance Analysis of $k$-ary $n$-cube Interconnection Networks", *IEEE Transactions on Computers*, 39(6), (Jun. 1990), 775-785.

Dally, W. J., "Virtual Channel Flow Control", *Proceedings, 17th International Symposium on Computer Architecture*, (May 1990), 60-68.

Duato, J., "A New Theory of Deadlock-Free Adaptive Routing in Wormhole Networks", *IEEE Transactions on Parallel and Distributed Systems*, 4(12), (Dec. 1993), 1320-1331.

Ernst, D., et al., "Cyclone: A Broadcast-Free Dynamic Instruction Scheduler with Selective Replay", *30th Annual International Symposium on Computer Architecture (ISCA-2003)*, (Jun. 2003), 10 pgs.

Gallager, R., "Scale Factors for Distributed Routing Algorithm", *NTC '77 Conference Record*, vol. 2, (1977),28:2-1—28:2-5.

Gharachorloo, K., "Two Techniques to Enhance the Performance of Memory Consistency Models", *Proceedings of the International Conference on Parallel Processing*, (1991),1-10.

Glass, C. J., et al., "The Turn Model for Adaptive Routing", *Proceedings, 19th Interanational Symposium on Computer Architecture*, (May 1992), 278-287.

Gravano, L , et al., "Adaptive Deadlock- and Livelock-Free Routing with all Minimal Paths in Torus Networks", *IEEE Transactions on Parallel and Distributed Systems*, 5(12), (Dec. 1994),1233-1251.

Gupta, R., et al., "High Speed Synchronization of Processors Using Fuzzy Barriers", *International Journal of Parallel Programming 19(1)*, (Feb. 1990),53-73.

Ishihata, H., et al., "Architecture of Highly Parallel AP1000 Computer", *Systems and Computers in Japan*, 24(7), (1993), 69-76.

Jesshope, C. R., et al., "High Performance Communications in Processor Networks", *Proc. 16th International Symposium on Computer Architecture*, (May 1989), 150-157.

Kirkpatrick, S. , et al., "Optimization by Simulated Annealing", *Science*, 220(4598), (May 13, 1983), 671-680.

Kontothanassis, L. , et al., "VM-based shared memory on low-latency, remote-memory-access networks", *Proceedings of the ACM ISCA '97*, (1997),157-169.

Linder, Daniel H., et al., "An Adaptive and Fault Tolerant Wormhole Routing Strategy for $k$-ary $n$-cubes", *IEEE Transactions on Computers*,40(1), (1991), 2-12.

Lui, Z , et al., "Grouping Virtual Channels for Deadlock-Free Adaptive Wormhole Routing", *5th International Conference, Parallel Architectures and Languages Europe (PARLE '93)*, (Jun. 14-17, 1993), 254-265.

Nuth, P., et al., "The J-Machine Network", *Proceedings of the IEEE International Conference on Computer Design on VLSI in Computer & Processors*, (1992), 420-423.

O'Keefe, M. T., et al., "Static Barrier MIMD: Architecture and Performance Analysis", *Journal of Parallel and Distributed Computing*, 25(2), (Mar. 25, 1995),126-132.

Patterson, David A., et al., *Computer Architecture: A Quantitative Approach*, 2nd Edition, Morgan Kaufmann Publishers, Inc., San Francisco, CA,(1996), 39-41.

Patterson, D. A., et al., *Computer Architecture: A Quantitative Approach*, 2nd Edition, Morgan Kaufmann Publishers, Inc., San Francisco, CA,(1996), 179-187, 373-384.

Patterson, D. A., et al., *Computer Architecture: A Quantitative Approach*, 2nd Edition, Morgan Kaufmann Publishers, Inc., San Francisco, CA,(1996), 699-708.

Patterson, D. A., et al., *Computer Architecture: A Quantitative Approach*, 2nd Edition, Morgan Kaufmann Publishers, Inc., San Francisco, CA, (1996), 194-197.

Scott, S., "Synchronization and Communication in the T3E Multiprocessor", *ASPLOS*, vol. II, (1996),pp. 26-36.

Shumway, M , "Deadlock-Free Packet Networks", *Transputer Research and Applications 2, NATUG-2 Proceedings of the Second Conference of the North American Transputer Users Group*, (Oct. 18-19, 1989), 139-177.

Snyder, L. , "Introduction to the Configurable, Highly Parallel Computer", *IEEE Computer 15(1)*, (Jan. 1982),47-56.

Talia, D., "Message-Routing Systems for Transputer-Based Multicomputers", *IEEE Micro*, 13(3), (Jun. 1993),62-72.

Wang, W., et al., "Trunk Congestion Control in Heterogeneous Circuit Switched Networks" , *IEEE Transactions on Communications*, 40(7), (Jul. 1992),1156-1161.

Wood, D. A., et al., "An In-Cache Address Translation Mechanism", *Proceedings of the 13th Annual Symposium on Computer Architecture*, (1986),358-365.

Wu, Min-You , et al., "Do and Forall: Temporal and Spatial Control Structures", *Proceedings, Third Workshop on Compilers for Parallel Computers, ACPC/TR*, (Jul. 1992), 258-269.

Yang, C. S., et al., "Performance Evaluation of Multicast Wormhole Routing in 2D-Torus Multicomputers", *Proceedings, Fourth International Conference on Computing and Information (ICCI '92)*, (1992),173-178.

Yantchev, J. , et al., "Adoptive, Low Latency, Deadlock-Free Packet Routing for Networks of Processors", *IEEE Proceedings*, 136, Part E, No. 3, (May 1989), 178-186.

Non-Final Office Action mailed Jul. 5, 2007 in U.S. Appl. No. 10/643,754; 23 pages.

Patterson, D. A., et al., *Computer Architecture: A Quantitative Approach*, 2nd Edition, Morgan Kaufmann Publishers, San Francisco, CA,(1996),241-243.

Patterson, D. A., et al., *Computer Architecture A Quantitative Approach*, 2nd Edition, Morgan Kaufmann Publishers, Inc., San Francisco,CA, (1996),255-260 & 308-317.

Patterson, D. , et al., "Computer Architecture: A Quantitative Approach", Second Edition, Morgan Kaufmann Publishers Inc. ,(1996),251-256.

"U.S. Appl. No. 10/235,898 Non Final Office Action mailed Jul. 7, 2004", 12pgs.

"U.S. Appl. No. 10/235,898 Notice of Allowance mailed Mar. 15, 2005", 4 pgs.

"U.S. Appl. No. 10/235,898 Response filed Jan. 6, 2005 to Non Final Office Action mailed Jul. 7, 2004", 16 pgs.

"U.S. Appl. No. 10/643,585, Advisory Action mailed Apr. 2, 2007", 3pgs.
"U.S. Appl. No. 10/643,585, Advisory Action mailed Aug. 14, 2006", 3 pgs.
"U.S. Appl. No. 10/643,585, Amendment and Response filed Dec. 4, 2006 to Office Action mailed Oct. 23, 2006", 17pgs.
"U.S. Appl. No. 10/643,585, Amendment and Response filed Mar. 22, 2007 to Final Office Action mailed Jan. 25, 2007", 23 pgs.
"U.S. Appl. No. 10/643,585, Amendment and Response filed Mar. 27, 2006 to Non-Final Office Action mailed Sep. 26, 2005", 7 pgs.
"U.S. Appl. No. 10/643,585, Amendment and Response filed Aug. 3, 2006 to Final Office Action mailed Apr. 14, 2006", 9 pgs.
"U.S. Appl. No. 10/643,585, Final Office Action mailed Jan. 25, 2007", 17 pgs.
"U.S. Appl. No. 10/643,585, Final Office Action mailed Apr. 14, 2006", 13 pgs.
"U.S. Appl. No. 10/643,585, Non-Final Office Action mailed Oct. 23, 2006", 12 pgs.
"U.S. Appl. No. 10/643,585, Non-Final Office Action mailed Sep. 26, 2005", 9 pgs.
"U.S. Appl. No. 10/643,585, Notice of Allowance mailed Jun. 11, 2007", 6 pgs.
"U.S. Appl. No. 10/643,585, RCE and Amendment and Response filed Apr. 23, 2007 to Final Office Action mailed Jan. 25, 2007 and the Advisory Action mailed Apr. 2, 2007", 15 pgs.
"U.S. Appl. No. 10/643,585, Request for Continued Examination filed Sep. 14, 2006", 1 pg.
"U.S. Appl. No. 10/643,585, Response to Rule 312 Communication mailed Jul. 23, 2007", 2 pgs.
"U.S. Appl. No. 10/643,586, Advisory Action mailed Jan. 18, 2007", 3 pgs.
"U.S. Appl. No. 10/643,586, Final Office Action mailed Oct. 19, 2006", 27 pgs.
"U.S. Appl. No. 10/643,586, Non-Final Office Action mailed Feb. 8, 2006", 21 pgs.
"U.S. Appl. No. 10/643,586, Non-Final Office Action mailed May 2, 2007", 36 pgs.
"U.S. Appl. No. 10/643,586, RCE and Amendment and Response filed Feb. 16, 2007 to Final Office Action mailed Oct. 19, 2006 and the Advisory Action mailed Jan. 18, 2007", 19 pgs.
"U.S. Appl. No. 10/643,586, Response filed Jan. 5, 2007 to Final Office Action mailed Oct. 19, 2006", 22 pgs.
"U.S. Appl. No. 10/643,586, Response filed Aug. 1, 2006 to Non-Final Office Action mailed Feb. 8, 2006", 24 pgs.
"U.S. Appl. No. 10/643,586 Response to Non-Final Office Action filed Sep. 4, 2007", 18 pgs.
"U.S. Appl. No. 10/643,587, Amendment and Response filed Aug. 13, 2007 to Non-Final Office Action mailed May 8, 2007", 20 pgs.
"U.S. Appl. No. 10/643,587, Non-Final Office Action mailed May 8, 2007", 14 pgs.
"U.S. Appl. No. 10/643,727 Notice of Allowance mailed Jul. 19, 2007", 6.
"U.S. Appl. No. 10/643,727, Non-Final Office Action mailed Feb. 16, 2006", 33 pgs.
"U.S. Appl. No. 10/643,727, Non-Final Office Action mailed Aug. 11, 2006", 29 pgs.
"U.S. Appl. No. 10/643,727, Notice of Allowance mailed Feb. 28, 2007", 5 pgs.
"U.S. Appl. No. 10/643,727, Response filed Jan.11, 2007 to Non-Final Office Action mailed Aug. 11, 2006", 15 pgs.
"U.S. Appl. No. 10/643,727, Response filed Jun. 15, 2006 to Non-Final Office Action mailed Feb. 16, 2006", 21 pgs.
"U.S. Appl. No. 10/643,742, Non-Final Office Action mailed Jun. 4, 2007", 13 pgs.
"U.S. Appl. No. 10/643,754, Advisory Action mailed Nov. 22, 2006", 3 pgs.
"U.S. Appl. No. 10/643,754, Final Office action mailed Sep. 14, 2006", 21 pgs.
"U.S. Appl. No. 10/643,754, Non-Final Office Action mailed Feb. 8, 2006", 16 pgs.
"U.S. Appl. No. 10/643,754, Non-Final Office Action mailed Jul. 5, 2007", 23 pgs.
"U.S. Appl. No. 10/643,754, Response filed Nov. 7, 2006 to Final Office Action mailed Sep. 14, 2006", 12 pgs.
"U.S. Appl. No. 10/643,754, Response filed Mar. 30, 2007 to Advisory Action mailed Nov. 22, 2006", 10 pgs.
"U.S. Appl. No. 10/643,754, Response filed Jul. 10, 2006 to Non-Final Office Action mailed Feb. 8, 2006", 12 pgs.
"U.S. Appl. No. 10/643,758, Notice of Allowance mailed Jul. 19, 2007", 4 pgs.
"U.S. Appl. No. 10/643,758, Advisory Action mailed May 1, 2007", 3 pgs.
"U.S. Appl. No. 10/643,758, Amendment and Response filed Jul. 10, 2006 to Final Office Action Mar. 10, 2006", 9 pgs.
"U.S. Appl. No. 10/643,758, Final Office Action mailed Feb. 6, 2007", 23 pgs.
"U.S. Appl. No. 10/643,758, Final Office Action mailed Mar. 10, 2006", 13 pgs.
"U.S. Appl. No. 10/643,758, Non-Final Office Action mailed Aug. 15, 2006", 15 pgs.
"U.S. Appl. No. 10/643,758, Non-Final Office Action mailed Aug. 30, 2005", 8 pgs.
"U.S. Appl. No. 10/643,758, Response filed Jan. 30, 2006 to Non-Final Office Action mailed Aug. 30, 2005", 9 pgs.
"U.S. Appl. No. 10/643,758, Response filed Dec. 14, 2006 to Non-Final Office Action mailed Aug. 15, 2006", 17 pgs.
"U.S. Appl. No. 10/643,758, Response filed Apr. 17, 2007 to Final Office Action mailed Feb. 6, 2007", 25 pgs.
U.S. Appl. No. 10/643,758, Notice of Allowance mailed Oct. 19, 2007, 4 pgs.
U.S. Appl. No. 10/643,742, Response filed Oct. 11, 2007 to Non-final Office Action mailed Jun. 4, 2007, 18 pages.
U.S. Appl. No. 10/643,754, Amendment & Response filed Oct. 9, 2007 to Non-final OA mailed Jul. 5, 2007, 14 pages.
Notice of Allowance mailed Oct. 23, 2007 in U.S. Appl. No. 10/643,586, 5 pages.
U.S. Appl. No. 10/643,586, Response filed Feb. 16, 2007 to Advisory Action mailed Oct. 19, 2006, 18 pgs.
U.S. Appl. No. 10/643,587, Final Office Action mailed Oct. 31, 2007, 19 pgs.
U.S. Appl. No. 10/643,754, Amendment and Response filed Jan. 25, 3008 to Final Office Action mailed Nov. 25, 2007, 20 pgs.
U.S. Appl. No. 10/643,754, Final Office Action Mailed Nov. 26, 2007, 29 pgs.
U.S. Appl. No. 10/643,754, Amendment and Response filed Mar. 26, 2008 to Final Office Action mailed Sep. 26, 2007, 12 pages.
Gail, et al., Tera Hardware-Software are cooperation, ACM (1997), 1-16 pgs.
U.S. Appl. No. 10/643,587, Non-Final Office Action mailed Jul. 9, 2008, 15 pgs.
U.S. Appl. No. 10/643,587, Response filed Apr. 30, 2008 to Final Office Action mailed Oct. 31, 2007, 10 pgs.
U.S. Appl. No. 10/643,742 Non-Final Office Action mailed Apr. 9, 2008, 12 pgs.
U.S. Appl. No. 10/643,754, Advisory Action mailed Feb. 8, 2008, 3 pgs.
U.S. Appl. No. 10/643,754, Non-Final Office Action mailed Jun. 25, 2008, 30 pgs.
U.S. Appl. No. 10/643,758, Advisory Action mailed May 1, 2007, 3 pgs.
U.S. Appl. No. 10/643,758, Notice of Allowance mailed Jun. 16, 2008, 6 pgs.
U.S. Appl. No. 10/643,758, Notice of Allowance mailed Jul. 19, 2007, 4 pgs.
Handy, J., "The Cache Memory Book", *Academic Press*, (1993), 73-84.
"U.S. Appl. No. 10/643,585 Non-Final Office Action Mailed On Sep. 15, 2008", 14 pgs.
"U.S. Appl. No. 10/643,742, Response filed Oct. 9, 2008 to Non Final Office Action mailed Apr. 9, 2008", 15 pgs.
"U.S. Appl. No. 10/643,758, Non Final Office Action Mailed Oct. 8, 2008", OARN, 12pgs.

* cited by examiner

SCHEDULING SYNCHRONIZATION OF PROGRAMS RUNNING AS STREAMS ON MULTIPLE PROCESSORS

FIELD

The present invention relates scheduling in computer systems, and more particularly to synchronizing the scheduling of programs running as streams on multiple processors.

RELATED FILES

This application is related to U.S. patent application Ser. No. 10/643,744, entitled "Multistreamed Processor Vector Packing Method and Apparatus", filed on even date herewith; to U.S. patent application Ser. No. 10/643,577, entitled "System and Method for Processing Memory Instructions", filed on even date herewith; to U.S. patent application Ser. No. 10/643,742, entitled "Decoupled Store Address and Data in a Multiprocessor System", filed on even date herewith; to U.S. patent application Ser. No. 10/643,586, entitled "Decoupled Scalar Vector Computer Architecture System and Method", filed on even date herewith; to U.S. patent application Ser. No. 10/643,585, entitled "Latency Tolerant Distributed Shared Memory Multiprocessor Computer", filed on even date herewith; to U.S. patent application Ser. No. 10/643,754, entitled "Relaxed Memory Consistency Model", filed on even date herewith; to U.S. patent application Ser. No. 10/643,758, entitled "Remote Translation Mechanism for a Multinode System", filed on even date herewith; and to U.S. patent application Ser. No. 10/643,741, entitled "Multistrean Processing Memory-And Barrier-Synchronization Method and Apparatus", filed on even date herewith, each of which is incorporated herein by reference.

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright © 2003, Cray, Inc. All Rights Reserved.

BACKGROUND

Through all the changes that have occurred since the beginning of the computer age, there has been one constant, the need for speed. In general, this need has been satisfied in one or both of two methods. The first method involves making the hardware faster. For example, each new generation of hardware, be it processors, disks, memory systems, network systems or bus architectures is typically faster than the preceding generation. Unfortunately, developing faster hardware is expensive, and there are physical limitations to how fast a certain architecture can be made to run.

The second method involves performing tasks simultaneously through parallel processing. In parallel processing, two or more processors execute portions of a software application simultaneously. Parallel processing can be particularly advantageous when a problem can be broken into multiple pieces that have few interdependencies.

While parallel processing has resulted in faster systems, certain problems arise in parallel processing architectures. One problem that arises is that the parallel processors often share resources, and contention for these shared resources must be managed. A second problem is that events affecting the application may occur and one or more of the parallel processes may need to be informed of the event. For example, an exception event may occur when an invalid arithmetic operation occurs. Each parallel processing unit of an application may need to know of the exception.

As a result, there is a need in the art for the present invention.

SUMMARY

The above-mentioned shortcomings, disadvantages and problems are addressed by the present invention, which will be understood by reading and studying the following specification.

One aspect of the systems and methods includes scheduling program units that are part of a process executed within an operating system. Additionally, at least one thread is started within the operating system, the thread is associated with the process. Further, a plurality of streams within the thread are selected for execution on a multiple processor unit. Upon the occurrence of a context shifting event, one of the streams enters a kernel mode. If the first stream to enter kernel mode must block, then the execution of the other streams of the plurality of streams is also blocked.

The present invention describes systems, clients, servers, methods, and computer-readable media of varying scope. In addition to the aspects and advantages of the present invention described in this summary, further aspects and advantages of the invention will become apparent by reference to the drawings and by reading the detailed description that follows.

DETAILED DESCRIPTION

Figure 1:
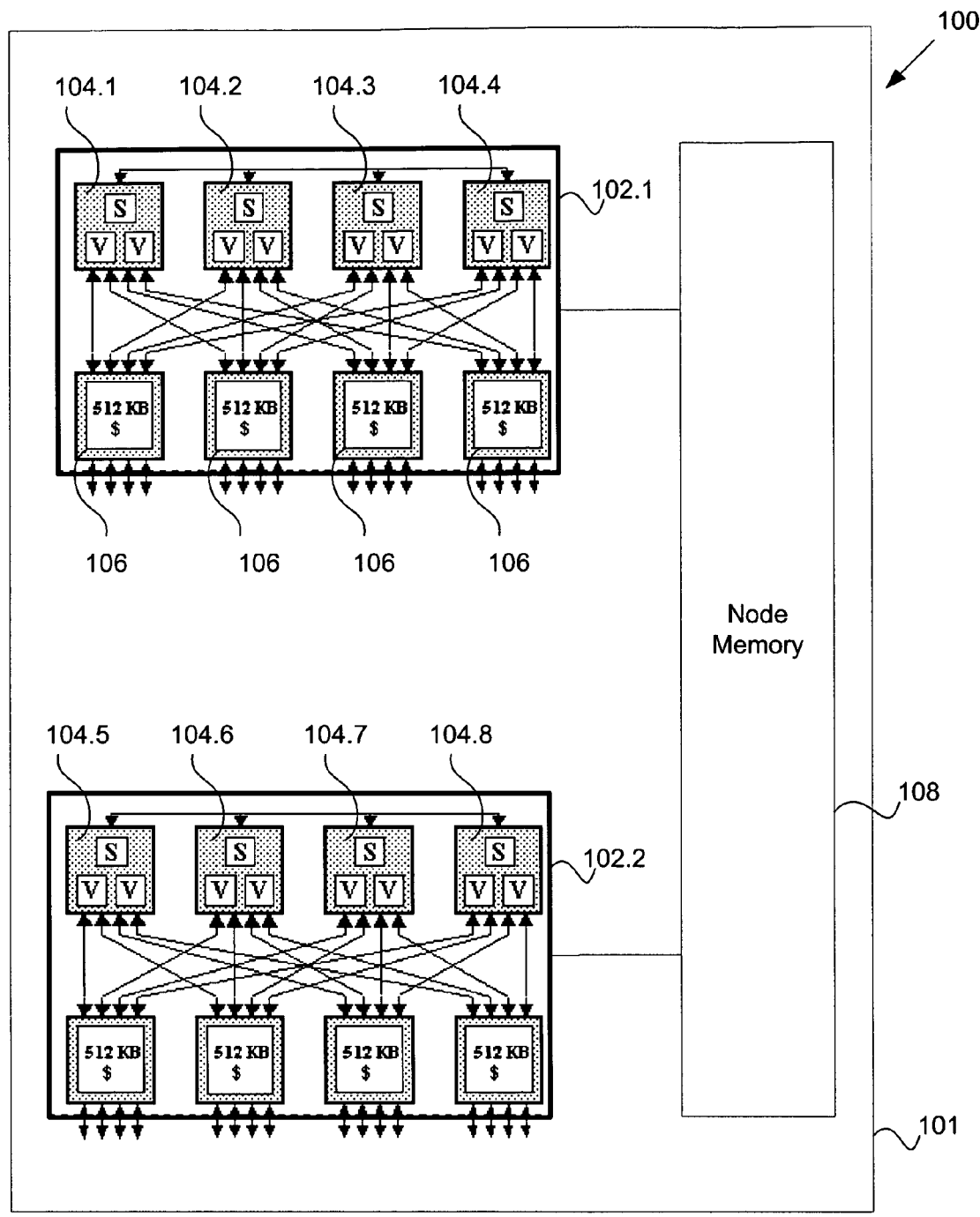
FIG. 1 is a block diagram of parallel processing hardware and operating environment in which different embodiments of the invention can be practiced.

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the scope of the present invention.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

In the Figures, the same reference number is used throughout to refer to an identical component which appears in multiple Figures. Signals and connections may be referred to by the same reference number or label, and the actual meaning will be clear from its use in the context of the description. Further, the same base reference number (e.g. 120) is used in the specification and figures when generically referring to the actions or characteristics of a group of identical components. A numeric index introduced by a decimal point (e.g. 120.1) is used when a specific component among the group of identical components performs an action or has a characteristic.

The following detailed description is, therefore, not to be taken in a limiting sense, and the scope of the present invention is defined only by the appended claims.

OPERATING ENVIRONMENT

FIG. 1 is a block diagram of parallel processing hardware and operating environment 100 in which different embodiments of the invention can be practiced. In some embodiments, environment 100 comprises a node 101 which includes two or more multiple processor units 102. Although two multiple processor units 102.1 and 102.2 are shown in FIG. 1, it will be appreciated by those of skill in the art that other number of multiple processor units may be incorporated in environment 100 and in configurations other than in a node 101. In some embodiments of the invention, node 101 may include up to four multiple processor units 102. Each of the multiple processor units 102 on node 101 has access to node memory 108. In some embodiments, node 101 is a single printed circuit board and node memory 108 comprises daughter cards insertable on the circuit board.

In some embodiments, a multiple processor unit 102 includes four processors 104.1-104.4 and four cache memory controllers 106. Although each multiple processor unit is shown in FIG. 1 as having four processors, those of skill in the art will appreciate that other embodiments of the invention may have more or fewer processors 104. In some embodiments, each processor 104 incorporates scalar processing logic (S) and vector processing logic (V). In some embodiments, each cache memory control 106 may access 512 KB of memory. Each of processor 104 may access any one or more of the cache memory controllers 106.

In one embodiment, the hardware environment is included within the Cray X1 computer system, which represents the convergence of the Cray T3E and the traditional Cray parallel vector processors. The Cray X1 computer system is a highly scalable, cache coherent, shared-memory multiprocessor that uses powerful vector processors as its building blocks, and implements a modernized vector instruction set. In these embodiments, multiple processor unit 102 is a Multi-streaming processor (MSP). It is to be noted that FIG. 1 illustrates only one example of a hardware environment, and other environments (for other embodiments) may also be used.

Figure 2:
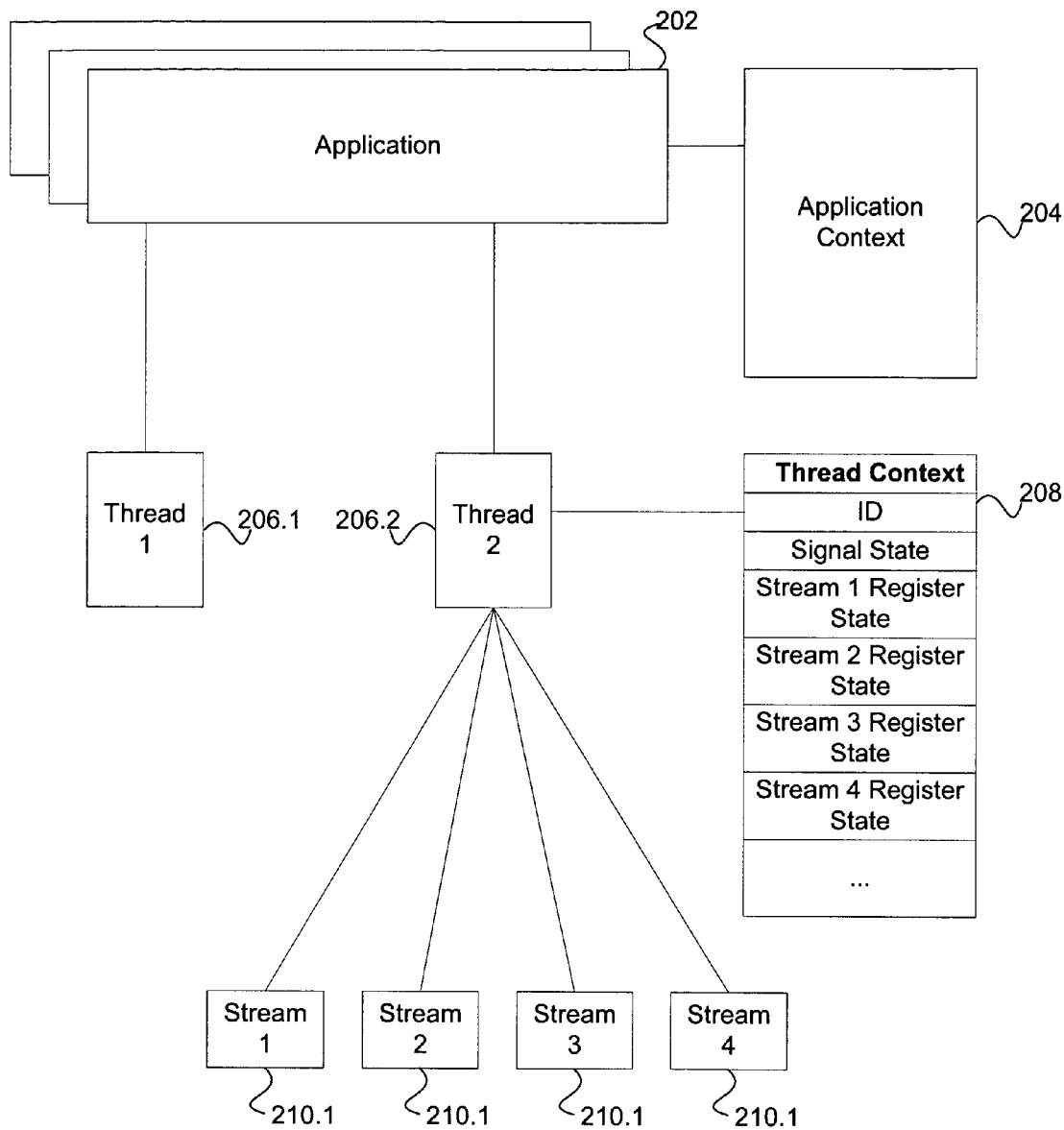
FIG. 2 is a block diagram of a parallel processing software environment according to embodiments of the invention.

FIG. 2 is a block diagram of a parallel processing software environment 200 according to embodiments of the invention. In some embodiments, software environment 200 comprises an operating system that manages the execution of applications 202. Applications may also be referred to as processes. In some embodiments of the invention, the operating system is a UNIX based operating system, such as the Unicos/mp operating system from Cray Inc. However, the invention is not limited to a particular operating system.

Application 202 may be configured to run as multiple program units. In some embodiments, a program unit comprises a thread 206. Typically, each thread 206 may be executed in parallel. In some embodiments, an application may have up to four threads and the operating environment assigns each thread to be executed on a different multiple processor unit 102. In some embodiments, the threads 206 of an application may be distributed across more than one multiple processor unit 102. For example, threads 206.1 may be assigned to multiple processor unit 102.1 and thread 206.2 of an application 202 may be assigned to multiple processor unit 102.2.

In addition, a thread 206 may be executed as multiple streams 210. Each stream 210 is assigned a processor 104 on the multiple processor unit 102 assigned to the thread. Typically a thread will be executed as multiple streams when there are vector operations that can take place in parallel, or when there have been sections of scalar code that have been identified as being able to execute in parallel. Each stream comprises code that is capable of being executed by the assigned processor 104 substantially independently and in parallel with the other processors 104 on the multiple processor unit 102.

In some embodiments, each application 202 has an application context 204 and each thread 206 has a thread context 208. Application context 204 and thread context 208 are used by the operating environment 200 to manage the state of an application and thread, and may be used to save and restore the state of the application as the application or thread is moved on or off a processor 104. In some embodiments, application context 204 includes information such as the memory associated with the application, file information regarding open files and other operating system information associated with the application. Thread context 208 includes information such as the register state for the thread, a signal state for the thread and a thread identification. The signal state includes information such as what signals are currently being handled by the thread and what signals are pending for the thread. Other thread context information includes a thread ID that may be used to identify and interact with the thread, and a set of stream register state data. The stream register state data comprises register data for the processor executing the stream.

Certain events require synchronization among the threads running as part of an application. For example, an event requiring a context shift for the application or thread may occur, and other threads running as part of the application may need to be informed or may need to handle the event.

Figure 3:
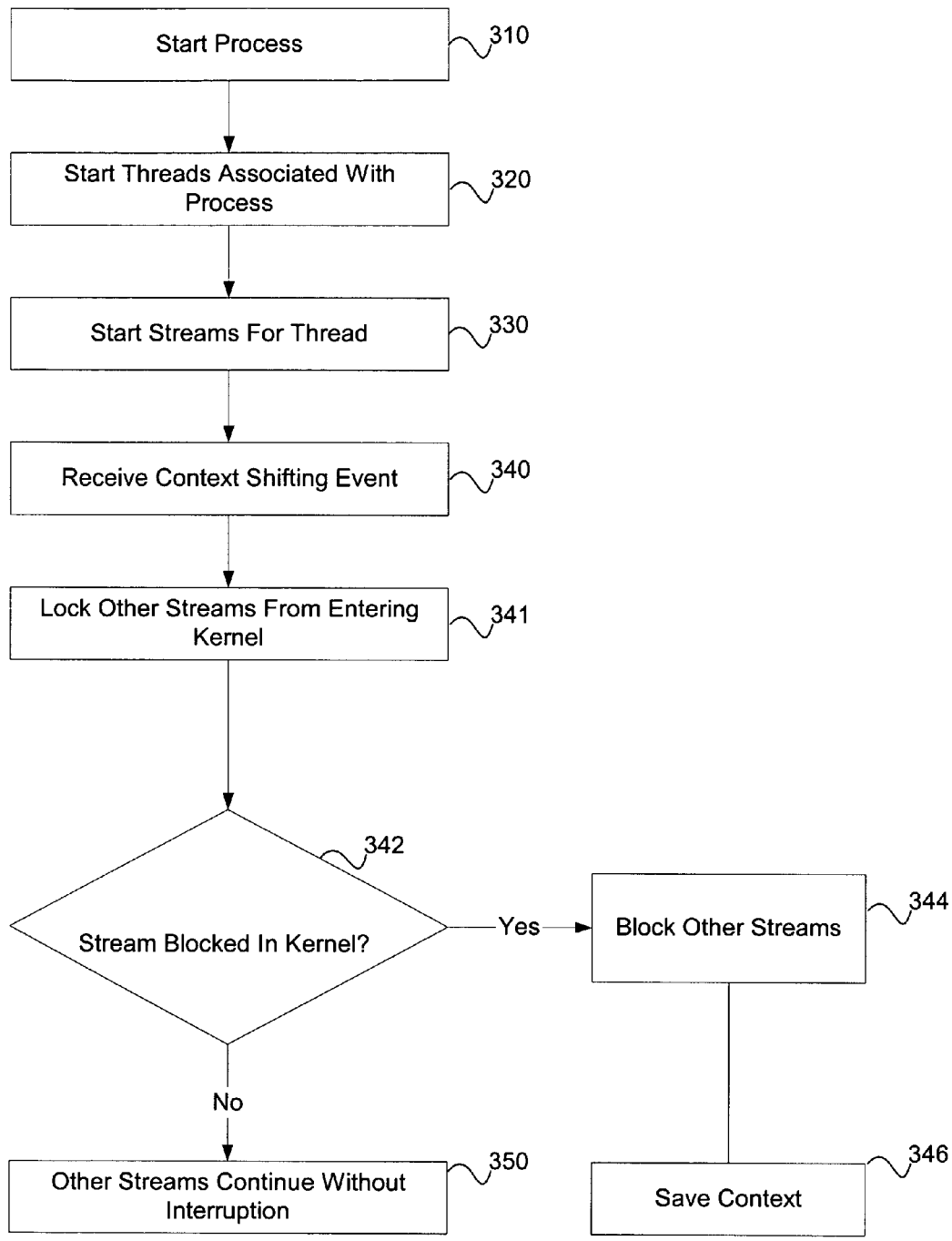
FIG. 3 is a flowchart illustrating a method according to an embodiment of the invention.

FIG. 3 is a flowchart illustrating a method for scheduling multiple streams for a thread in a parallel processing environment according to an embodiment of the invention. The method to be performed by the operating environment constitutes computer programs made up of computer-executable instructions. Describing the methods by reference to a flowchart enables one skilled in the art to develop such programs including such instructions to carry out the methods on suitable computers (the processor or processors of the computer executing the instructions from computer-readable media). The method illustrated in FIG. 3 is inclusive of acts that may be taken by an operating environment executing an exemplary embodiment of the invention.

The method begins when an application is started within an operating system (block 310). Typically the application will be scheduled on one of the processors in the system as one of many processes executing within an operating environment.

Next, the application indicates that threads should be started (block 320). In some embodiments, the operating system arranges for the threads to be scheduled on one of the available multiple processor units.

Next, the system identifies streams within a thread and schedules the streams on one of the processors on a multiple processor unit (block 330). As noted above, a stream comprises code (vector or scalar) that can be executed in parallel on the processor.

During the execution of one or more of the threads and/or streams within the thread, a context shifting event may occur (block 340). There are multiple reasons for context shift events, the quantity and type of context shifting event will depend on the operating environment. Typically the context shift will require an elevated privilege for the thread or stream. In some embodiments, the elevated privilege is achieved by entering kernel mode.

In some embodiments of the inventions, the context shifting event is a "signal." A signal in Unicos/mp and other UNIX variations is typically an indication that some type of exceptional event has occurred. Examples of such events include floating point exceptions when an invalid floating point operation is attempted, a memory access exception when a process or thread attempts to access memory that does not exist or is not mapped to the process. Other types of signals are possible and known to those of skill in the art. Additionally, it should be noted that in some operating environments, a signal may be referred to as an exception.

In alternative embodiments, the context shifting event may be a non-local goto. For example, in Unicos/mp and other UNIX variants, a combination of "setjmpo" and "longjmp( )" function calls can establish a non-local goto. In essence, the "setjmp" call establishes the location to go to, and the "longjmp" call causes process or thread to branch to the location. The goto is a non-local goto because it causes the execution of the thread or process to continue at a point outside of the scope of the currently executing function. A context shift is required, because the processor registers must be set to reflect the new process or thread execution location.

In further alternative embodiments, the context shifting event may be a system call. Typically a system call requires that the process or thread enter a privileged mode in order to execute the system call. In Unicos/mp and UNIX variants, the system call must typically execute in kernel mode, while normally a process or thread executes in user mode. In order to execute in kernel mode, a context shift is required.

Those of skill in the art will appreciate that other context shifting events are possible and within the scope of the invention.

Upon receiving indication of a context shifting event, the first stream that enters kernel mode sets a lock to prevent other streams executing on processors in multiple processor unit 102 from also entering kernel mode (block 341). Methods of setting and clearing locks are known in the art and are typically provided by the operating environment.

The stream that enters kernel mode will typically be executing using a kernel stack. As the stream is executing in kernel mode, it may or may not need to block within the kernel to wait for the availability of a resource (block 342). If the stream does not need to block within the kernel, the other streams executing on other processors of multiple processor unit 102 continue to operate in user (non-privileged) mode (block 350). An example of a case where a stream entering the kernel may not need to block is when the stream needs to interact with a TLB (Translation Lookaside Buffer). Typically the code executed in the kernel for this type of operation is fairly short, and does not have the potential for interfering with other streams or processes.

However, if the stream executing in kernel mode needs to block, then the other streams executing on other processors are also blocked (block 344). In some embodiments, a hardware interrupt may be sent to the other processors to indicate that they should block.

In some embodiments, the streams being blocked execute instructions to save their current context into thread context stream register state data associated with their stream (block 346). In some embodiments, the streams need to execute kernel code in order to save their context. In these embodiments, the first stream to enter the kernel executes using the kernel stack. The subsequent streams are allowed to enter the kernel, but execute on auxiliary stacks.

CONCLUSION

Systems and methods for scheduling threads in a parallel processing environment have been disclosed. The systems and methods described provide advantages over previous systems.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

The terminology used in this application is meant to include all of these environments. It is to be understood that the above description is intended to be illustrative, and not restrictive. Many other embodiments will be apparent to those of skill in the art upon reviewing the above description. Therefore, it is manifestly intended that this invention be limited only by the following claims and equivalents thereof.

We claim:

1. A method for scheduling streams of instructions, the method comprising:
   starting a process within an operating system of a processor;
   starting at least one thread within the operating system, the at least one thread associated with the process;
   executing a plurality of streams of instructions within the at least one thread;
   entering a kernel mode by a first stream of instructions of the plurality of streams of instructions upon the occurrence of a context shifting event; and
   if the first stream entering the kernel mode must be blocked, then blocking the execution of the others of the plurality of streams of instructions subsequent to the first stream of instructions.

2. The method of claim 1, further comprising saving a context of each of the plurality of streams of instructions in a thread context data structure.

3. The method of claim 2, wherein each one of the streams of instructions are executed on a separate processor.

4. The method of claim 1, wherein the context shifting event comprises an exception.

5. The method of claim 4 wherein the exception comprises a signal.

6. The method of claim 1 wherein the context shifting event comprises a non-local goto.

7. The method of claim 1, wherein the context shifting event comprises a system call.

8. A system for scheduling streams of instructions, the system comprising:
- at least one multiple processor unit having a plurality of processors;
- a memory coupled to the plurality of processors; and
- an application executed by at least one of the plurality of processors to perform the steps of:
  - starting a process within an operating system of at least one of the plurality of processors,
  - starting at least one thread within the operating system, the at least one thread associated with the process;
  - executing a plurality of streams of instructions within the at least one thread,
  - entering a kernel mode by a first stream of instructions of the plurality of streams of instructions upon the occurrence of a context shifting event, and
  - if the first stream of instructions entering the kernel mode must be blocked then blocking the execution of the others of the plurality of streams of instructions of subsequent to the first stream of instructions.

9. The system of claim 8, further comprising saving a context of each of the plurality of streams of instructions in a thread context data structure.

10. The system of claim 9, wherein each one of the stream of instructions of the plurality of streams of instructions are executed on a separate processor.

11. The system of claim 8, wherein the context shifting event comprises an exception.

12. The system of claim 11 wherein the exception comprises a signal.

13. The system of claim 8 wherein the context shifting event comprises a non-local goto.

14. The system of claim 8, wherein the context shifting event comprises a system call.

15. A computer-readable media having computer executable codes executing by a processor that perform a method of scheduling streams of instructions comprising:
- starting a process within an operating system of a processor;
- starting at least one thread within the operating system, the at least one thread associated with the process;
- executing a plurality of streams of instructions within the at least one thread;
- entering a kernel mode by a first stream of instructions of the plurality of streams of instructions upon the occurrence of a context shifting event; and
- if the first stream of instructions entering the kernel mode must be blocked, then blocking the execution of the others of the plurality of streams of instructions subsequent to the first stream of instructions.

16. The computer-readable media having computer executable codes executing by a processor that perform a method of scheduling streams of instructions of claim 15, further comprising saving a context of each of the plurality of streams of instructions in a thread context data structure.

17. The computer-readable media of claim 16, wherein each one of the streams of instructions is executed on a separate processor.

18. The computer-readable media of claim 15, wherein the context shifting event comprises an exception.

19. The computer-readable media of claim 18 wherein the exception comprises a signal.

20. The computer-readable media of claim 15 wherein the context shifting event comprises a non-local goto.

21. The computer-readable media of claim 15, wherein the context shifting event comprises a system call.

\* \* \* \* \*

UNITED STATES PATENT AND TRADEMARK OFFICE
CERTIFICATE OF CORRECTION

PATENT NO. : 7,503,048 B1
APPLICATION NO. : 10/643769
DATED : March 10, 2009
INVENTOR(S) : Sheets et al.

It is certified that error appears in the above-identified patent and that said Letters Patent is hereby corrected as shown below:

Title Page; item (56);
On Page 2, under "Foreign Patent Documents", in column 2, line 8, delete "WO-96/102831" and insert -- WO-96/10283 --, therefor.

On Page 3, under "Other Publications", in column 2, line 45, after "Annual" insert -- International --.

In column 1, line 22, delete "Scalar Vector" and insert -- Scalar/Vector --, therefor.

In column 1, line 31, delete "Multistrean" and insert -- Multistream --, therefor.

In column 5, line 45, delete ""setjmpo"" and insert -- "setjmp()" --, therefor.

In column 7, line 29, in Claim 8, after "blocked" insert -- , --.

Signed and Sealed this

Thirtieth Day of June, 2009

JOHN DOLL
*Acting Director of the United States Patent and Trademark Office*